Patented Sept. 12, 1922.

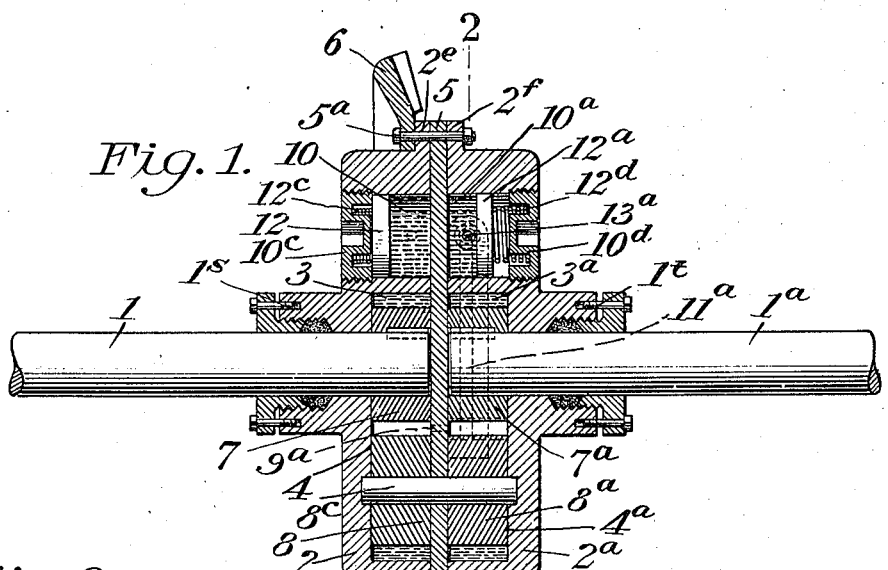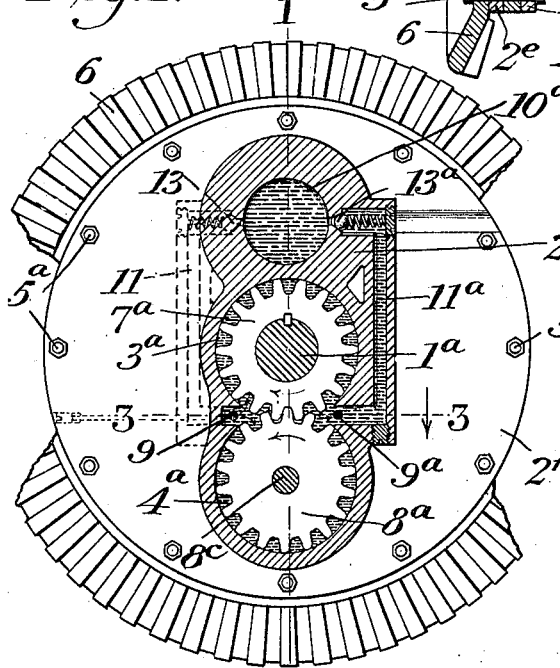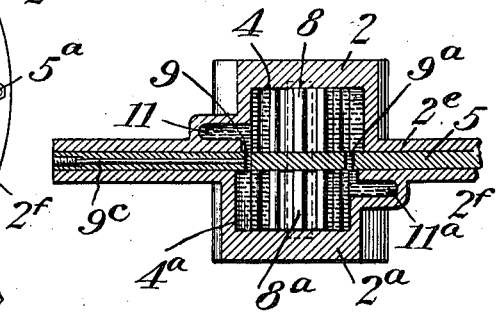

1,429,100

UNITED STATES PATENT OFFICE.

DAVID E. ROSS, OF LAFAYETTE, INDIANA, ASSIGNOR TO ROSS GEAR AND TOOL COMPANY, OF LAFAYETTE, INDIANA, A CORPORATION OF INDIANA.

DIFFERENTIAL GEAR.

Application filed April 23, 1917. Serial No. 163,940.

*To all whom it may concern:*

Be it known that I, DAVID E. ROSS, a citizen of the United States, residing at Lafayette, in the county of Tippecanoe and State of Indiana, have invented certain new and useful Improvements in Differential Gears; and I hereby declare that the following is a full, clear, and exact description thereof, reference being had to the accompanying drawings, which form part of this specification.

This invention is a novel differential gear employing liquid as a means for normally locking the members and as a brake for regulating the relative displacement of the members caused by one of the parts being compelled or impelled to move at a different speed from the other; such as would be caused if the differential gear was used on the rear axle of an automobile when the vehicle was turning a corner; or such as might happen to automobiles if one rear wheel dropped into softer ground than the other, and as a consequence would tend to rotate with undue rapidity relative to the other.

The object of the invention is to provide a very simple, liquid controlled, differential gear; which will be very compact and be practically noiseless in operation and will prevent one part racing relative to the other; and in which the maximum speed of relative rotation of one part to the other can be predetermined or controlled with the greatest nicety.

In the accompanying drawings I have illustrated one practical embodiment of the invention, a description of which will enable those familiar with the art to adapt and use the same; and in the claims I have summarized the essential features for which protection is desired.

In said drawings:

Figure 1 is a vertical section through the differential gear on line 1—1 Fig. 2.

Figure 2 is a section through the gear on line 2—2 Fig. 1 partly broken away.

Figure 3 is a section on line 3—3 Fig. 2 looking downward.

1 and $1^a$ designate the opposite members of the axle or shaft upon which the differential gear is mounted.

In the construction shown the differential gear comprises a casing, which may be of any desired form and as indicated in Fig. 2 is preferably made of approximately similar but opposed castings 2 and $2^a$, provided with internal central chambers 3 and $3^a$ respectively, and radially offset chambers 4 and $4^a$ respectively inter-connecting with chambers 3 and $3^a$.

Chambers 3, $3^a$, are separated from chambers 4, $4^a$ by a partition 5, which may be rigidly secured in the casing between members 2 and $2^a$ by means of bolts $5^a$ transfixing the opposite flanges $2^e$ and $2^f$ on the members 2 and $2^a$ and the edge of said partition, as shown in Fig. 1.

An annular driving bevel gear 6 may be secured to the flanges by the same bolts $5^a$ as indicated in the drawings; but rotatory motion may be imparted to the gear casing in any desired manner.

The parts should be so constructed that the chambers 3 and $3^a$ have no communication except through the ports hereinafter referred to, and there can be no leakage of fluid from the chambers.

The opposite castings 2, $2^a$ are provided with openings disposed axially of the chambers 3, $3^a$ for the entrance of the shafts 1, $1^a$, respectively, and with suitable stuffing boxes $1^s$, $1^t$ to prevent leakage of fluid around said shafts.

Mounted fixedly upon the shaft 1 within the chamber 3 is a gear 7 which meshes with a gear 8 in the chamber 4; and fixedly mounted on the end of shaft $1^a$ within the chamber $3^a$ is a gear $7^a$ meshing with a gear $8^a$ in the chamber $4^a$. These gears are of such size as to closely fill the chambers except at their meshing points; and each pair of gears, 7, $7^a$; and 8, $8^a$; constitutes a rotary gearpump. The gears 8, $8^a$ may be mounted on a shaft $8^c$ stepped in the inner sides of the adjacent castings 2, $2^a$ and extending through an opening in the partition 5 as indicated in Fig. 1.

These chambers and parts and all interior spaces in the casing are to be kept constantly fully filled with fluid, such as heavy oil. All the parts should be so formed and fitted that there can be practically no leakage of oil around the gears or between the gears and the sides of the casing or from one set of chambers into the other set of chambers.

The chamber 3 communicates with chamber 3ᵃ through ports 9 and 9ᵃ at opposite sides of the meshing portions of the gears, see Fig. 2. These ports form an open but restricted communication between the chambers 3 and 3ᵃ. Under usual normal conditions when the gear 6 is turned clockwise, carrying the casing 2, 2ᵃ, the tendency of the gear pumps (7—8 and 7ᵃ—8ᵃ) will be to force the oil in opposite directions through the ports 9, 9ᵃ; that is both sets of gears tend to force oil from opposite sides of the partition 5 through the port 9 for example; and as, in this case, one gear pump opposes the other both gear pumps would be stopped by the fluid pressure, and consequently normally the gears 3, 3ᵃ cannot relatively rotate, and therefore the shafts 1, 1ᵃ are normally caused to turn together with the casing 2.

Assuming for instance that shafts 1, 1ᵃ form the rear axle of a vehicle; so long as such vehicle is moving in a straight line the gear-pumps will be held against relative movement, but if one member 1ᵃ has to turn faster than the other, this tends to produce a rolling motion of the related outer pump-gear (8 or 8ᵃ) around its related inner pump-gear (7 or 7ᵃ); and this circumferential or orbital movement of the outer pump-gear relative to the inner pump-gear produces a circulation of fluid through the ports 9 and 9ᵃ; but the speed at which it is possible for the outer pump-gear to take up this orbital motion around the inner pump-gear is limited or dependent upon the size of the ports 9, 9ᵃ and the velocity and pressure of the fluid impelled through said ports.

Should such vehicle be turned so that shaft 1ᵃ would have to move faster than shaft 1, there would be a corresponding relative movement between the two gear-pumps, 7—8, and 7ᵃ—8ᵃ; the rapidity of such movement depending upon the size of the ports 9 and 9ᵃ. In turning the vehicle one set of gears therefore would pump oil more rapidly than the other and there would be a circulation of oil established between the chambers through the ports sufficient to enable the member 1ᵃ of the shaft to make a slow movement relative to the other member of the shaft and permit difference in rotating speed of the two shafts. The maximum difference in rotating speed would be determined by the size of the ports 9, 9ᵃ which should be calculated for a maximum speed of relative movements of the members 1, 1ᵃ.

When the vehicle starts forward again on a straight line both sets of gears will again have the same action and each will again thereby pump fluid oppositely and equally and therefore held, and both members of the shaft be impelled uniformly with the gear 6.

The size of such ports, or of one of them, should be so calculated that the maximum relative speed or displacement of the orbital movement of the outer gear around the inner gear of the pump is controlled thereby. In this way if one of the wheels of the vehicle should drop into soft ground or the resistance to one member of the shaft be suddenly reduced, the tendency of such member of the shaft to race would be retarded by the restricted circulation of the fluid, and the ports should be so restricted that one member of the shaft could not race beyond a predetermined relative speed at the maximum, even if one member should be suddenly freed from resistance, or the other member should suddenly have a much greater resistance applied to it.

The ports could be adjustably controlled by any suitable means. In the example shown in Fig. 3 the port 9 can be restricted by means of a rod 9ᶜ, which may be fitted in a bore in the partition 5 intersecting the port 9; and this rod 9ᶜ may be provided with a threaded portion engaging the correspondingly threaded outer end of the bore, and by screwing rod 9ᶜ in or out the area of the port 9 can be restricted more or less to regulate or control, as desired, the amount of fluid which may pass through such port in a given time under a given pressure.

For convenience, and to insure that the pump chambers and connecting ports shall always be full of fluid, chambers 10 and 10ᵃ may be formed in the castings 2, 2ᵃ at the sides thereof diametrically opposite the chambers 4 and 4ᵃ. These chambers form oil reservoirs and with their appurtenances substantially counterbalance the chambers 4 and 4ᵃ and gears therein. These oil reservoirs or chambers 10, 10ᵃ may be respectively connected with ducts or passages 11, 11ᵃ formed in the castings; the duct 11 leading to the port 9 and the duct 11ᵃ leading to the port 9ᵃ. Oil may be forcibly expelled from the chambers 10, 10ᵃ by means of plungers 12, 12ᵃ which may be forced inward to expel the oil by means of suitable expansion springs 12ᶜ, 12ᵈ interposed between the plungers 12, 12ᵃ and the caps 10ᶜ and 10ᵈ that close the outer ends of the oil chambers. Back flow of oil under pressure from the pump chambers to the reservoir may be prevented by suitable check valves 13, 13ᵃ, which may be located in the passages 11, 11ᵃ as indicated in the drawings.

What I claim is:

1. A differential gear having adjacent pump chambers and ports connecting the said chambers so as to make a closed circuit for fluid between them; intermeshing inner and outer rotary gears in said pump chambers; axle sections respectively connected to pump-gears in adjacent chambers; and fluid filling said chambers whereby the said gears are normally held against relative rotatorial displacement, but the outer gear of either pump may be permitted an orbital movement relative to the inner gear, substantially as specified.

2. A differential gear having adjacent pump chambers and ports connecting the said chambers so as to form a closed circuit for fluid between the chambers, intermeshing inner and outer rotary gears in said pump chambers; fluid filling said chambers whereby the said gears are normally held against rotatorial displacement; axle sections respectively connected to the gears in adjacent chambers, said ports being so restricted that racing of one pump relative to the other is prevented, but the outer gear of either pump may be permitted to move circumferentially around its inner gear, substantially as specified.

3. In a differential gear the combination of a rotatable casing having adjacent rotary gear pump chambers at opposite sides and ports, rotary gear pumps in said chambers respectively connected to opposite shaft sections, said pumps having inner and outer gears, the ports in said casing establishing a restricted closed fluid circuit between said pump chambers, said chambers and ports being filled with fluid whereby the gears are normally held, but the outer gear of either pump may be permitted to move circumferentially around its related inner gear, and means for controlling the flow of fluid through the ports.

4. A differential gear comprising a casing having two axially disposed adjacent gear pump chambers and ports, and adjacent gear chambers communicating with the axially disposed gear pump chambers, intermeshing inner and outer pump-gears in said communicating chambers; the ports connecting the chambers at opposite sides of the meshing portions of the gears, shaft sections extending through opposite sides of the casing and respectively attached to the inner pump-gears, said chambers being filled with fluid whereby the gears are normally held but the outer gear of either pump may be permitted an orbital movement around the related inner gear, substantially as specified.

5. A differential gear having adjacent pump chambers and ports connecting the said chambers so as to form a closed circuit for fluid between the chambers, intermeshing rotary gears in said pump chambers, shaft sections respectively connected to pump-gears in adjacent chambers, the said gears being normally held against relative rotatorial displacement by fluid in said chambers; a fluid supply chamber, ducts leading from the fluid supply to the pump chambers, and means for preventing return flow of fluid to the supply chamber.

6. A differential gear having adjacent pump chambers and ports connecting the said chambers to form a closed circuit for fluid between the chambers, intermeshing rotary gears in said pump chambers, the said gears being normally held against relative rotatorial displacement by the fluid in said chambers, shaft sections respectively connected to the gears in adjacent chambers, the gear having a fluid chamber adjacent each pump chamber, a duct leading from each fluid chamber to the related pump chamber, and valves to prevent back flow of fluid from the pump chambers to the fluid chambers.

7. A differential gear having adjacent pump chambers and ports, intermeshing rotary gears in said pump chambers, shaft sections respectively connected to the gears in adjacent chambers, the ports connecting the said chambers to form a closed circuit for fluid between the chambers, the said gears being normally held against relative rotatorial displacement by the fluid in said chambers; with a fluid supply, ducts leading from said supply to the pump chambers, valves for preventing return flow of fluid to the supply, and spring means for expelling fluid from the fluid supply to the pump chambers.

8. In a differential gear, a casing having two axially disposed adjacent pump chambers and two adjacent radially disposed gear chambers respectively connecting with the adjacent pump chambers; inner and outer pump-gears in said connecting chambers; ports connecting the chambers at opposite sides of the meshing portions of the gears; shaft sections extending through opposite sides of the casing and respectively attached to the inner pump gears, means for rotating the casing, and fluid filling said chambers whereby the gears are normally held, but the outer gear of either pump is permitted a circumferential movement relative to the inner gear; with a fluid supply in the casing adjacent each pump chamber, a duct leading from the fluid supply to the related pump chamber, valves preventing back flow of fluid to the supply; and spring means for expelling fluid from the supply to the pump chambers.

9. A hydraulic traction equalizing device for an automobile or like motor driven machine, comprising a rotatable casing adapted to be driven by the motive power of said machine, two traction axles concentric with and projecting from the casing, two sets of spur gear pump gears, one set attached to each axle, enclosed in the casing, each in separate liquid tight recesses without open communicating passages between the compression and suction sides thereof, and adapted to cause the axles to rotate with said casing, a passage for the flow of the liquid medium between the compression sides of the two separate recesses, and another passage between the suction sides of the two recesses, the flow of liquid through said passages permitting a relative variation in the rotative movement of the two axles.

10. A hydraulic clutch mechanism comprising a power driven rotatable casing having separate, liquid tight gear recesses, two sets of spur gear pump gears arranged in said recesses, and two shafts journalled in said casing concentric with and attached respectively each to one of the gears of said sets of pump gears, the compression and suction sides of said pump gear recesses being in communication, and said casing having a storage chamber communicating with said gear recesses to replenish leakage therefrom.

In testimony that I claim the foregoing as my own, I affix my signature.

DAVID E. ROSS.